US009311501B2

(12) United States Patent
Islam et al.

(10) Patent No.: US 9,311,501 B2
(45) Date of Patent: *Apr. 12, 2016

(54) USING DIFFERENT SECURE ERASE ALGORITHMS TO ERASE CHUNKS FROM A FILE ASSOCIATED WITH DIFFERENT SECURITY LEVELS

(75) Inventors: Shah Mohammad R. Islam, Tucson, AZ (US); Sandeep R. Patil, Elmsford, NY (US); Riyazahamad M. Shiraguppi, Maharashtra (IN); Divyank Shukla, Pune (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 732 days.

This patent is subject to a terminal disclaimer.

(21) Appl. No.: 13/430,430

(22) Filed: Mar. 26, 2012

(65) Prior Publication Data
US 2013/0254507 A1 Sep. 26, 2013

(51) Int. Cl.
*G06F 12/00* (2006.01)
*G06F 21/62* (2013.01)

(52) U.S. Cl.
CPC .... *G06F 21/6218* (2013.01); *G06F 2221/2113* (2013.01); *G06F 2221/2143* (2013.01)

(58) Field of Classification Search
CPC .................................................. G06F 3/0652
See application file for complete search history.

(56) References Cited

U.S. PATENT DOCUMENTS

| 6,070,174 | A | 5/2000 | Starek et al. |
| 7,650,473 | B1 | 1/2010 | Tomasov et al. |
| 7,861,095 | B2 * | 12/2010 | Varma et al. ................... 713/193 |
| 7,912,817 | B2 | 3/2011 | Love et al. |
| 8,024,530 | B2 | 9/2011 | Deetz et al. |
| 2002/0078026 | A1 | 6/2002 | Fergus |
| 2002/0095593 | A1 * | 7/2002 | Daniell et al. ................. 713/200 |
| 2003/0079078 | A1 | 4/2003 | Zipprich et al. |
| 2008/0016132 | A1 | 1/2008 | Merhar |
| 2009/0100212 | A1 | 4/2009 | Boyd et al. |
| 2009/0216907 | A1 | 8/2009 | Eastman et al. |
| 2010/0077159 | A1 | 3/2010 | Jin |
| 2010/0122047 | A1 | 5/2010 | Vasilievna et al. |

(Continued)

OTHER PUBLICATIONS

U.S. Appl. No. 13/477,991, filed May 22, 2012, entitled "Using Different Secure Erase Algorithms to Erase Chunks From a File Associated With Different Security Levels", invented by S.R. Mohammad, et al., 34 pp.

(Continued)

*Primary Examiner* — Daniel Tsui
(74) *Attorney, Agent, or Firm* — David W. Victor; Konrad Raynes Davda & Victor LLP

(57) ABSTRACT

Provided are a computer program product, system, and method for using different secure erase algorithms to erase chunks from a file associated with different security levels. A request is received to secure erase a file having a plurality of chunks stored in at least one storage device. A determination is made of a first secure erase algorithm to apply to a first chunk in the file in response to the request and of a second secure erase algorithm to apply to a second chunk in the file in response to the request. The first secure erase algorithm is applied to erase the first chunk and the second secure erase algorithm is applied to erase the second chunk. The first and second secure erase algorithms use different processes to erase the chunks to which they are applied.

22 Claims, 7 Drawing Sheets

(56) References Cited

U.S. PATENT DOCUMENTS

| | | |
|---|---|---|
| 2010/0174865 A1 | 7/2010 | Koester |
| 2011/0154060 A1 | 6/2011 | Fuyot et al. |
| 2011/0219049 A1 | 9/2011 | Zaitsev |
| 2011/0238901 A1* | 9/2011 | Koga et al. ............ 711/103 |
| 2011/0242590 A1* | 10/2011 | Takahashi ............ 358/1.15 |

OTHER PUBLICATIONS

Preliminary Amendment for U.S. Appl. No. 13/477,991, filed May 22, 2012, 6 Pages.

P. Mell, et al., "The NIST Definition of Cloud Computing", National Institute of Standards and Technology, Information Technology Laboratory, Version 15, Oct. 7, 2009, pp. 1-2.

T.M. Jones, "Anatomy of a Cloud Storage Infrastructure", IBM Corp., developerWorks, 2010, pp. 1-13.

Wikipedia, "Data Erasure", [online][retrieved Feb. 28, 2012] http://en.wikipedia.org/w/index.php?title=Data_erasure&printable=yes.

Wikipedia, "Data Remanence", [online][retrieved Feb. 28, 2012] http://en.wikipedia.org/w/index.php?title=Data_remanence&printable=yes.

PCT International Search Report dated Apr. 25, 2013 for Serial No. PCT/CN2013/070417 filed Jan. 14, 2013.

"Information Materials for IDS" dated May 10, 2013, pp. 2.

Final Office Action dated Jan. 29, 2015, pp. 16, for U.S. Appl. No. 13/477,991, filed May 22, 2012.

Office Action dated Aug. 13, 2014, pp. 21, for U.S. Appl. No. 13/477,991, filed May 22, 2012.

Response dated Nov. 13, 2014, pp. 9, to Office Action dated Aug. 13, 2014, pp. 21, for U.S. Appl. No. 13/477,991, filed May 22, 2012.

Response dated Mar. 30, 2015, pp. 9, to Final Office Action dated Jan. 29, 2015, pp. 16, for U.S. Appl. No. 13/477,991, filed May 22, 2012.

Notice of Allowance dated Apr. 17, 2015, pp. 7, for U.S. Appl. No. 13/477,991, filed May 22, 2012.

* cited by examiner

File Chunk Information

Security Level Algorithm Information

Security Level Storage Information

| FileName | ChunkOffset (in KB) | ChunkSize (in KB) | SecurityLevel (0 highest-5 lowest) |
|---|---|---|---|
| File1 | 0 | 1000 | 2 |
| File1 | 1000 | 1400 | 0 |
| File2 | 0 | 800 | 2 |
| File2 | 800 | 1000 | 0 |
| File2 | 1000 | 1500 | 1 |
| File2 | 1500 | 1800 | 0 |
| File3 | 0 | 1200 | 2 |

FIG. 5

| Algorithm | Security | Write Cycles |
|---|---|---|
| Gutmann Method | Highest | 35 |
| National Industrial Security Program Operating Manual: DoD 5220.22-M (E) Standard | High | 7 |
| BSI IT Baseline Protection Manual | Medium | 6 |
| National Industrial Security Program Operating Manual: value pattern, complement, value | Low | 3 |
| Overwrite With zeros | Lowest | 1 |

FIG. 6

USING DIFFERENT SECURE ERASE ALGORITHMS TO ERASE CHUNKS FROM A FILE ASSOCIATED WITH DIFFERENT SECURITY LEVELS

BACKGROUND OF THE INVENTION

1. Field of the Invention

The present invention relates to a computer program product, system, and method for using different secure erase algorithms to erase chunks from a file associated with different security levels.

2. Description of the Related Art

A secure erase algorithm (also referred to as data clearing or data wiping) is a software program that deletes a file by overwriting the file data one or more times with a data pattern to remove any remnants of the data from the storage device to prevent an unauthorized user from accessing the remnants of the deleted data. Permanent data erasure goes beyond basic file deletion commands, which only remove direct pointers to data disk sectors and make data recovery possible with common software tools. Unlike degaussing and physical destruction, which render the storage media unusable, secure erasure removes all information while leaving the disk operable, preserving information technology assets and the environment.

Software-based overwriting uses a software application to write patterns of random meaningless data onto all of a hard drive's sectors. There are key differentiators between data erasure and other overwriting methods, which can leave data intact and raise the risk of data breach or spill, identity theft and failure to achieve regulatory compliance. Many data eradication programs also provide multiple overwrites so that they support recognized government and industry standards.

Secure erasure algorithms that perform multiple passes of the overwrite operation require additional computational resources to perform the multiple overwrites.

Further, different portions of a file may be associated with different security levels. In certain prior art file servers, the file server may analyze security levels assigned to chunks (comprising consecutive blocks in the file) or sections of a file, and then select storage devices commensurate with the security levels assigned to the chunks to store the chunks so that chunks of a file are dispersed in different storage devices based on the security levels of the chunks. For instance, file chunks with high security requirements can be stored on storage device with built-in encryption while file chunks with normal security requirement can be stored on Just Bunch of Disks (JBODs) or array controllers.

There is a need in the art for improved techniques for implementing a secure erase operation for a file.

SUMMARY

Provided are a computer program product, system, and method for using different secure erase algorithms to erase chunks from a file associated with different security levels. A request is received to secure erase a file having a plurality of chunks stored in at least one storage device. A determination is made of a first secure erase algorithm to apply to a first chunk in the file in response to the request and of a second secure erase algorithm to apply to a second chunk in the file in response to the request. The first secure erase algorithm is applied to erase the first chunk and the second secure erase algorithm is applied to erase the second chunk. The first and second secure erase algorithms use different processes to erase the chunks to which they are applied.

BRIEF DESCRIPTION OF THE DRAWINGS

FIG. 5 illustrates an example of file chunk information.

FIG. 6 illustrates an example of security level algorithm information.

DETAILED DESCRIPTION

Described embodiments provide techniques to perform a secure erase operation on a file comprised of a plurality of chunks, where different chunks may be associated with different security levels. The chunks are processed to select one of a plurality of secure erase algorithms to erase a chunk based on the security level of a chunk. In this way, computationally expensive high security secure erase algorithms are used for those chunks having a higher security level and less computationally expensive secure erase algorithms are used for chunks having relatively lower security levels.

Figure 1:
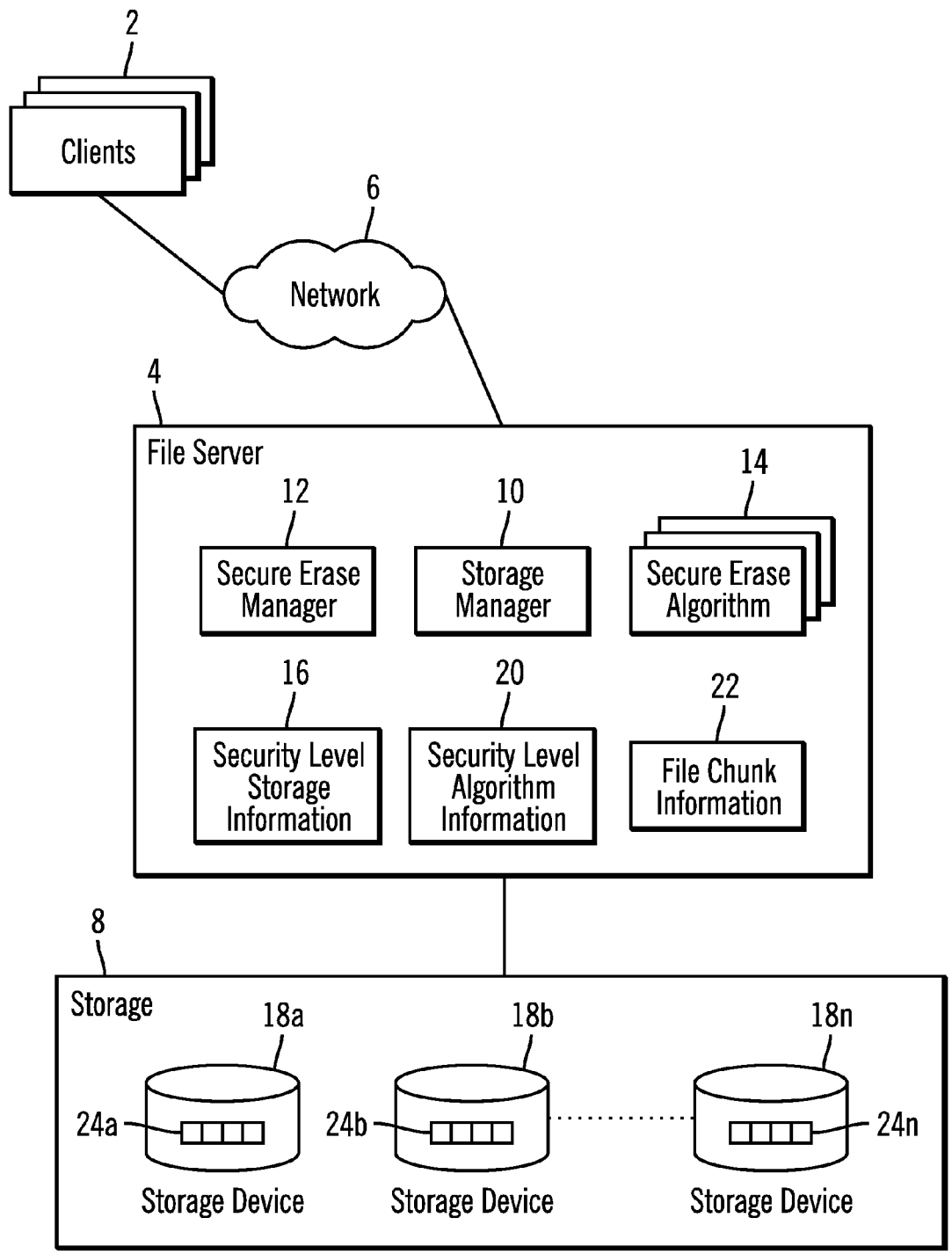
FIG. 1 illustrates an embodiment of a computing environment.

FIG. 1 illustrates an embodiment of a file server environment including one or more client computers 2 that provide files to a file server 4 over a network 6 to store in storage 8. The file server 4 includes a storage manager 10 to manage the storage of files from the clients 4 in the storage 8; a secure erase manager 12 to manage secure erasure of files in the storage 8; a plurality of secure erase algorithms 14 providing different algorithms for performing a secure erase of files; security level storage information 16 associating storage devices 18a, 18b . . . 18n with security levels so that the storage devices 18a, 18b . . . 18n store data having the security level associated with that storage devices 18a, 18 . . . 18n; security level algorithm information 20 associating security levels with different of the secure erase algorithms 14 and file chunk information 22 providing information on chunks of the files in the storage 8 and chunk security level information, where different chunks of one file may be associated with different security levels.

The storage 8 is comprised of different storage devices 18a, 18b . . . 18n, each of which may be associated with a different security level to provide a level of secure storage commensurate with the associated security level. Each storage device 18a, 18b . . . 18n stores one or more chunks 24a, 24b . . . 24n, respectively, from files, where the chunks for one file associated with different security levels may be stored in different storage devices 18a, 18b . . . 18n implementing the different security levels assigned to the file chunks. The storage devices 18a, 18b . . . 18n may comprise different physical storage devices or may be implemented in different logical volumes or units on one or more physical storage devices.

Each file chunk may comprise a series of consecutive blocks associated with a same security level.

The file server 4 may comprise a server class enterprise computing device capable of servicing requests from multiple connected clients 21. The clients 4 may comprise a desktop computer, server, host, portable computing device, such as a smart phone, tablet computing device, telephony device, laptop computer, portable device capable of being mounted in an automobile, etc.

The storage 8 may be implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, Solid State Devices (SSD), storage-class memory (SCM)), electronic memory, magnetic tape media, tape cartridges, etc. The network 6 may comprise a local area network (LAN), storage area network (SAN), wide area network (WAN), a wireless network, the Internet, etc. The network 8 may include wireless network routers and may be part of a cloud computing model.

Figure 2:
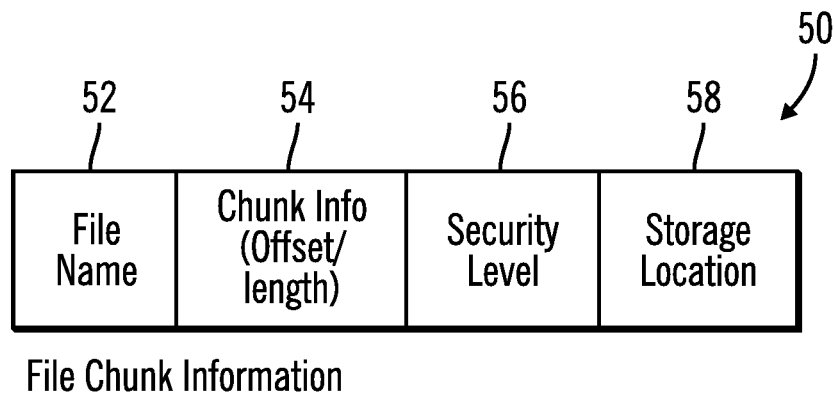
FIG. 2 illustrates an embodiment of file chunk information.

FIG. 2 illustrates an embodiment of a file chunk information entry 50 in the file chunk information 22, including a file name 52; chunk information 54, such as the offset of where the chunk starts in the file and a length of the chunk; chunk security level information 56 for the chunk; and a storage location 58 in one of the storage devices 18a, 18b . . . 18n where the chunk is stored. There may be one entry 50 in the file chunk information 22 for each chunk in a file.

The security level 56 for a chunk may be determined from a data structure transmitted with the write request for the file that provides the security levels for the storage manager 10 to use to select the storage devices 18a, 18b . . . 18n of appropriate security levels to store the chunks. Alternatively, the security levels for the chunks may be included in file metadata or extended attributes of the file, such as in the file header and other fields.

Different chunks of one file may have different security levels. For instance, a chunk of a file may represent a section or table that has high security information, such as financial, password, credit card, social security information, etc., where other parts of the file may not have high security and sensitive data. In such case, the different security levels that apply to the chunks are commensurate with the security level of data in the chunks.

Figure 3:
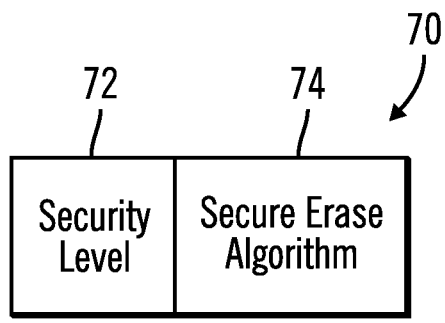
FIG. 3 illustrates an embodiment of security level algorithm information.

FIG. 3 illustrates an embodiment of a security level algorithm information entry 70 in the security level algorithm information 20 including a security level 72 and a secure erase algorithm 74 comprising one of the secure erase algorithms 14 to use for the security level 72. Secure erase algorithms 14 may differ by providing different patterns of data to overwrite and a number of times to perform the overwrite of the sectors being erased, where higher security secure erase algorithms may provide more complex patterns and/or more write passes, thus requiring more computational resources than lower security secure erase algorithms that perform a fewer number of overwrite passes of the data.

Figure 4:
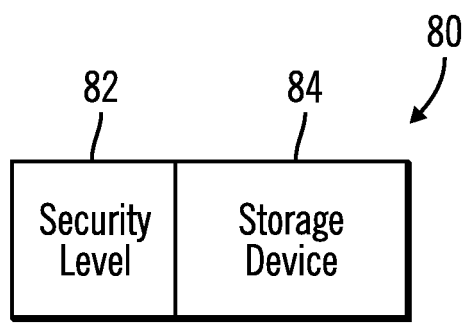
FIG. 4 illustrates an embodiment of security level storage information.

FIG. 4 illustrates an embodiment of a security level storage information entry 80 in the security level storage information 16 indicating a security level 82 and a storage device 84 comprising one or more of the storage devices 18a, 18b . . . 18n to use to store chunks having the associated security level 82. The storage manager 10 uses the security level storage information 80 to determine the storage device 18a, 18b . . . 18n to use to store the chunks of the file, so that storage devices 18a, 18b . . . 18n commensurate with the security levels of the chunks are selected to store the chunks.

FIG. 5 illustrates an example of file chunk information 100 providing chunk information and associated security level information for the chunks in multiple files, "File1" and "File2".

FIG. 6 illustrates an example of the security level algorithm information 102 that provides different secure erase algorithms for different security levels. The highest security level, "Gutman Method", has the highest number of write cycles or number of overwrites. Secure erase algorithms associated with lower security levels have fewer write cycles (passes) of the overwrite pattern. The secure erase algorithms may be associated with suitable secure erase or wiping algorithms known in the art.

Figure 7:
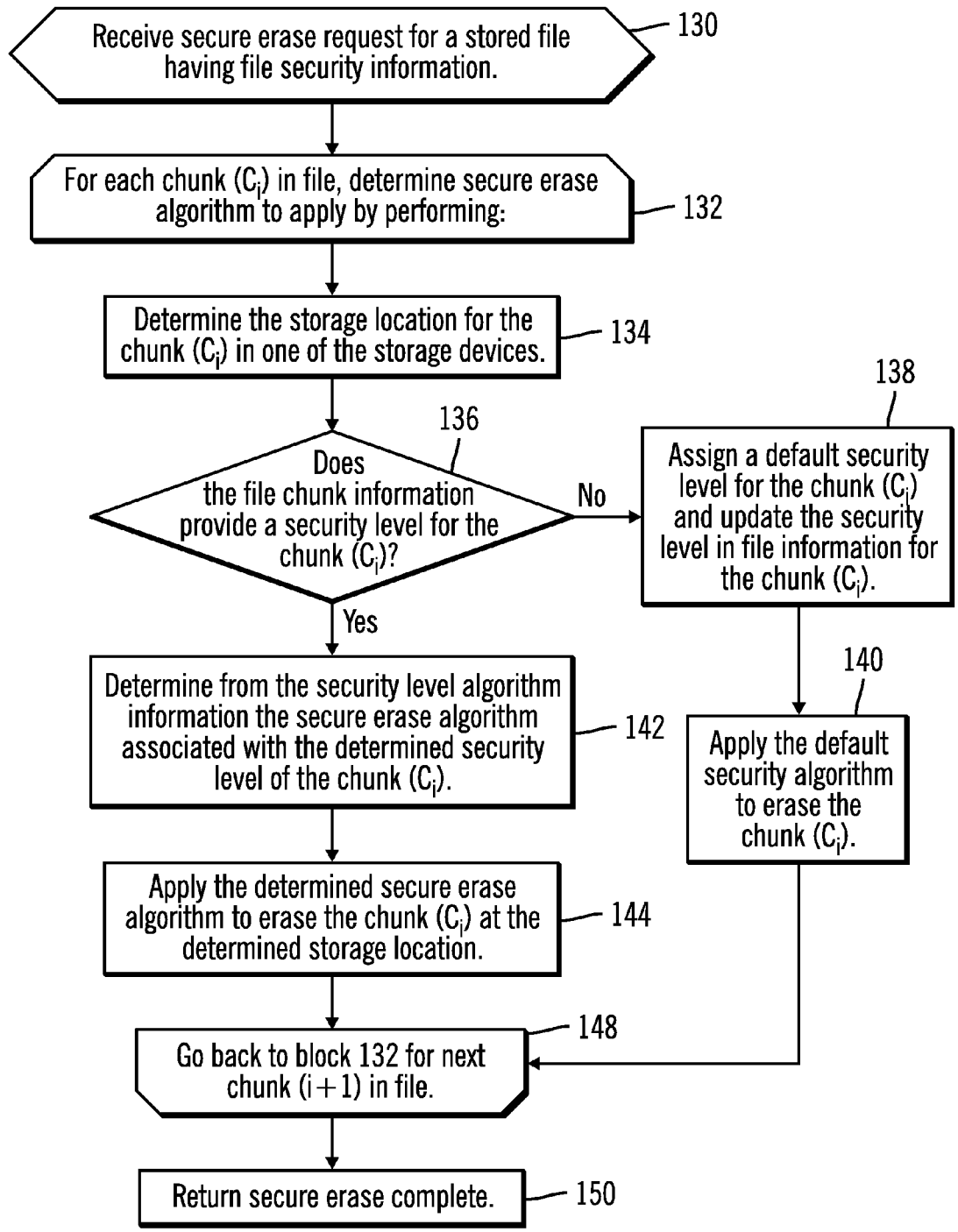
FIG. 7 illustrates an embodiment of operations to apply secure erase algorithms to erase chunks of a file.

FIG. 7 illustrates an embodiment of operations performed by the secure erase manager 12 to process a secure erase request from a client 4 with respect to a file. Upon receiving (at block 130) the secure erase request for a stored file, where the chunks of the requested file may be stored on different storage devices 18a, 18b . . . 18n, the secure erase manager 12 performs the operations at blocks 132 through 148 for each chunk ($C_i$) in the file. At block 134, the secure erase manager 12 determines the storage location 58 for the chunk ($C_i$) in one of the storage devices 18a, 18b . . . 18n from the chunk information entry 50 for the chunk ($C_i$). If (at block 136) the file chunk information 50 for chunk ($C_i$) does not provide a security level 56 for the chunk ($C_i$), then the secure erase manager 12 may assign (at block 138) a default security level for the chunk (Ci), such as the highest security level or another security level, and update the security level 54 in the file information 50 (FIG. 2) for the chunk (Ci) with the default assigned security level. The default secure erase algorithm 14 is then applied (at block 140) to erase the chunk ($C_i$). If (at block 136) a security level 56 is provided, then the secure erase algorithm 74 associated with the provided security level 56 is determined (at block 142) from the security level algorithm information 20. The secure erase manager 12 applies (at block 144) the determined secure erase algorithm 74 to erase the chunk ($C_i$) at the determined storage location 58 in one of the storage devices 18a, 18b . . . 18n. After performing a secure erase operation for each chunk of a file, where the chunks of the file may be distributed across different storage devices 18a, 18b . . . 18n associated with different security levels and secure erase algorithms, the secure erase manager 10 returns complete (at block 150) to the client 4 initiating the secure erase request.

Described embodiments provide techniques to utilize different secure erase algorithms to erase chunks from a file, where the different chunks of the file may be associated with different security levels. This optimizes the secure erase operation by using less computational consuming secure erase algorithms to erase chunks associated with lower security levels in order to minimize the usage of computationally expensive high security level secure erase algorithms used to erase chunks having higher security data.

Cloud Computing Embodiments

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing environment may provide cloud based secure storage and secure erase of file chunks provided from clients in the network.

The cloud computing implementation is further described with respect to FIGS. 1-7. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
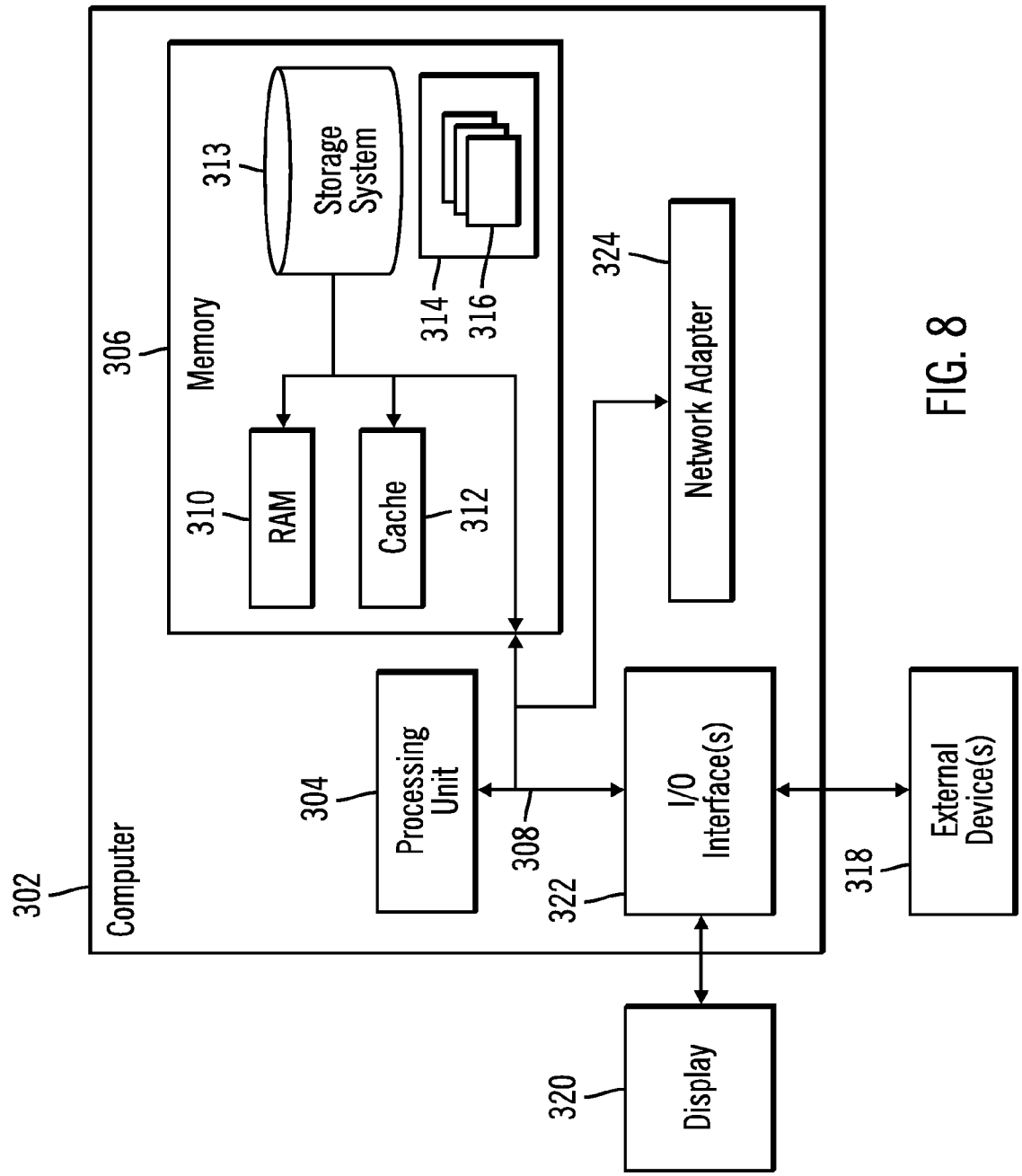
FIG. 8 illustrates an implementation of a computer/server node in the network computing embodiment.

FIG. 8 illustrates an embodiment of a cloud computing node or computer 302 which may comprise an implementation of the clients 4 and file server 4. Computer 302 is only one example of a suitable cloud computing node and is not intended to suggest any limitation as to the scope of use or functionality of embodiments of the invention described herein. Regardless, cloud computing node 302 is capable of being implemented and/or performing any of the functionality set forth hereinabove.

The cloud computing computer 302 is operational with numerous other general purpose or special purpose computing system environments or configurations. Examples of well-known computing systems, environments, and/or configurations that may be suitable for use with computer system/server 302 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server (cloud node) 302 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 9:
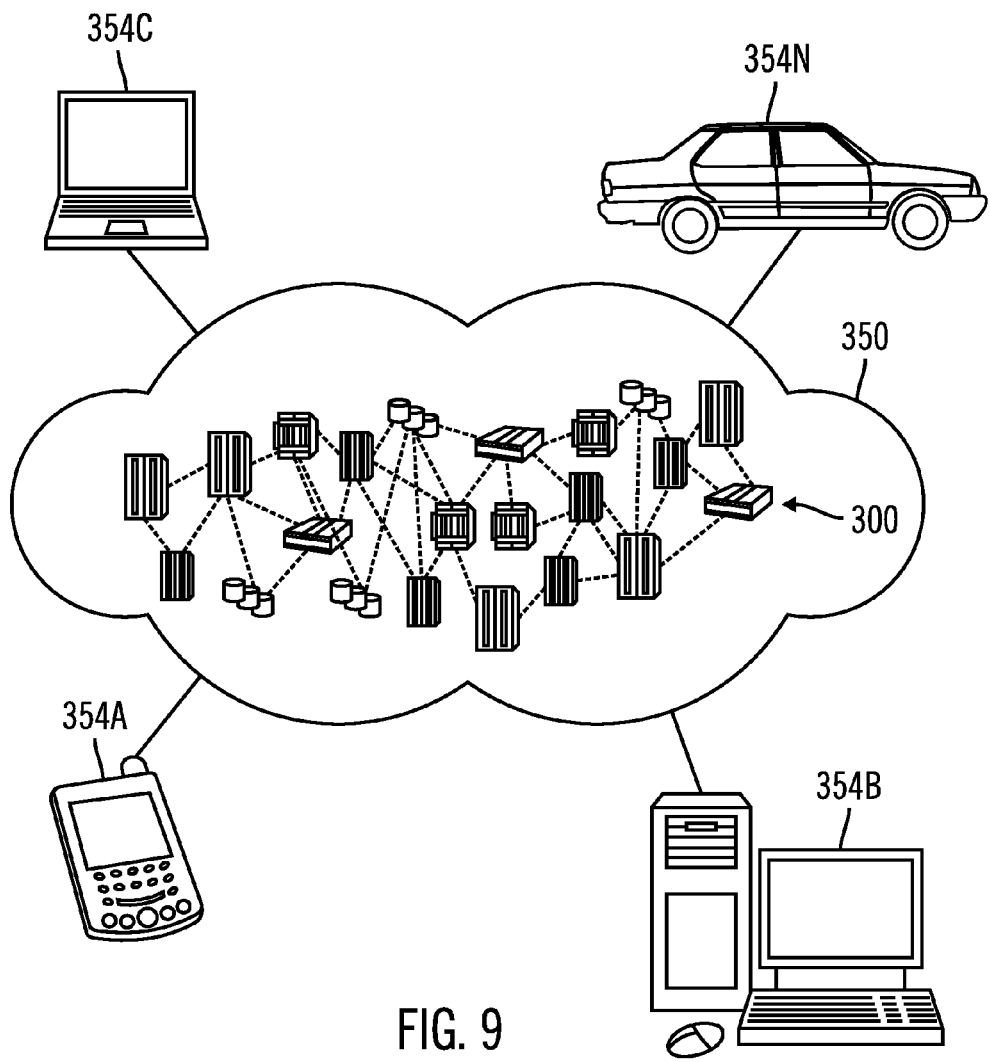
FIG. 9 illustrates an embodiment of a cloud computing environment.

FIG. 9 illustrates an embodiment of a cloud computing environment 350. As shown, cloud computing environment 350 comprises one or more cloud computing nodes 302 with which local computing devices used by cloud consumers, such as, for example, personal digital assistant (PDA) or cellular telephone 354A, desktop computer 354B, laptop computer 354C, and/or automobile computer system 354N may communicate. Nodes 302 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 9 are intended to be illustrative only and that computing nodes 302 and cloud computing environment 350 can communicate with any type of computerized device over any type of network and/or network addressable connection (e.g., using a web browser).

Figure 10:
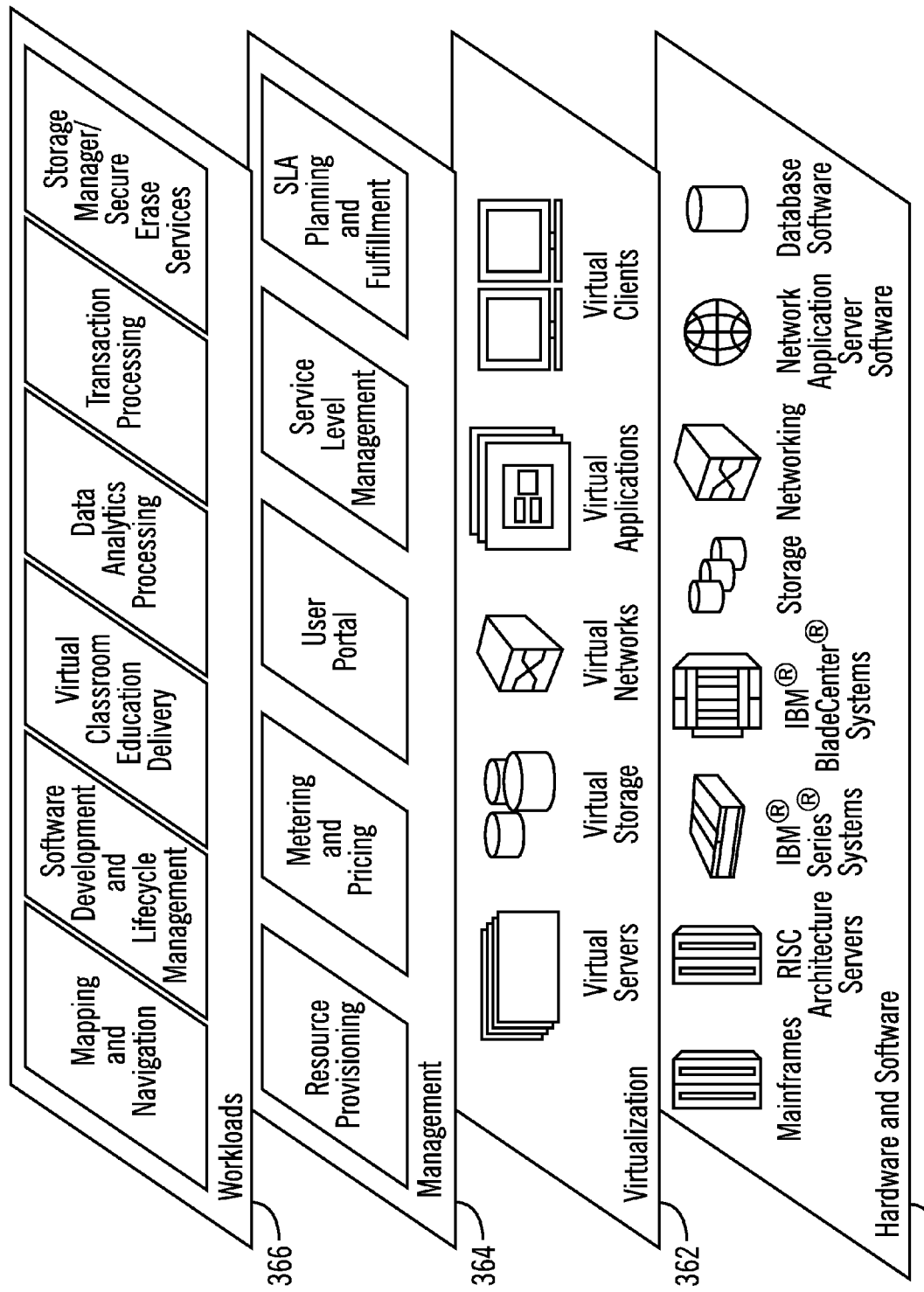
FIG. 10 illustrates an embodiment of abstraction model layers of a cloud computing environment.

FIG. 10 provides an embodiment a set of functional abstraction layers provided by cloud computing environment 350. It should be understood in advance that the components, layers, and functions shown in FIG. 10 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual sources.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions may provide secure storage and secure erase services for a cloud computing environment such as described with respect to FIGS. 1-7, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for secure deleting a file, wherein the computer program product comprises a non-transitory computer readable storage medium having computer readable program code embodied therein that executes to perform operations, the operations comprising:
   receiving a request to secure erase a file having a plurality of chunks stored in at least one storage device;
   receiving chunk security level information associating at least one of a plurality of security levels with the chunks of the file;
   determining a first secure erase algorithm to apply to a first chunk in the file in response to the request based on the security level for the first chunk indicated in the chunk security level information;
   determining a second secure erase algorithm to apply to a second chunk in the file in response to the request based on the security level for the second chunk indicated in the chunk security level information;
   applying the first secure erase algorithm to erase the first chunk; and
   applying the second secure erase algorithm to erase the second chunk, wherein the first and second secure erase algorithms use different processes to erase the chunks to which they are applied.

2. The computer program product of claim 1, wherein a determination is made for each chunk in the file, including the first and second chunks, based on the security levels for each of the chunks indicated in the chunk security level information, to apply at least one of the first secure erase algorithm and the second secure erase algorithm, and wherein the determined secure erase algorithm for the chunk is applied to erase the chunk.

3. The computer program product of claim 1, wherein the determining of the first secure erase algorithm comprises:
   determining from the chunk security level information a first security level associated with the first chunk; and
   determining from the first security level the first secure erase algorithm associated with the first security level.

4. The computer program product of claim 3, wherein the determining of the second secure erase algorithm comprises:
   determining from the chunk security level information a second security level associated with the second chunk; and
   determining from the second security level the second secure erase algorithm associated with the second security level.

5. The computer program product of claim 4, wherein the operations further comprise:
   maintaining security level algorithm information associating security levels with secure erase algorithms, including associating the first security level with the first secure erase algorithm and associating the second security level with the second secure erase algorithm,
   wherein the determining from the first security level the first secure erase algorithm comprises determining from the security level algorithm information the first secure erase algorithm that is associated with the first security level provided for the first chunk,
   wherein the determining from the second security level the second secure erase algorithm comprises determining from the security level algorithm information the second secure erase algorithm that is associated with the second security level provided for the second chunk.

6. The computer program product of claim 1, wherein the operations further comprise:
   maintaining security level algorithm information associating security levels with secure erase algorithms, including associating the first security level with the first secure erase algorithm and associating the second security level with the second secure erase algorithm;
   determining that the chunk security level information does not provide a security level for the second chunk;
   using a default secure erase algorithm comprising one of the first and the second secure erase algorithms to erase the second chunk in response to determining that the chunk security level information does not provide the security level for the second chunk.

7. The computer program product of claim 6, wherein the default secure erase algorithm provides a maximum secure erase protection of the security algorithms indicated in the secure erase algorithm information.

8. The computer program product of claim 1, wherein the chunk security level information is provided in metadata separate from the file.

9. The computer program product of claim 8, wherein the operations further comprise:
   using the chunk security level information to select storage locations on which to store the chunks, wherein different storage locations are associated with different security levels, and wherein storage locations are selected to store chunks that provide secure storage commensurate with the security levels assigned to the chunks in the chunk security level information.

10. The computer program product of claim 1, wherein the chunk security level information is included in a write request to write the file to storage, wherein chunks comprise contiguous blocks associated with a same security level, and wherein the chunk security level information is used to select storage devices associated with different security levels to store the chunks of the file for the write request.

11. The computer program product of claim 1, wherein the first and second secure erase algorithms are different in at least one of a pattern of data to write and a number of times the pattern of data is written.

12. A system in communication with at least one storage device storing files having a plurality of chunks, comprising:
    a processor;
    a computer readable storage medium including code executed by the processor to perform operations, the operations comprising:
        receiving a request to secure erase a file having a plurality of chunks stored in at least one storage device;
        receiving chunk security level information associating at least one of a plurality of security levels with the chunks of the file;
        determining a first secure erase algorithm to apply to a first chunk in the file in response to the request based on the security level for the first chunk indicated in the chunk security level information;
        determining a second secure erase algorithm to apply to a second chunk in the file in response to the request based on the security level for the second chunk indicated in the chunk security level information;
        applying the first secure erase algorithm to erase the first chunk; and
        applying the second secure erase algorithm to erase the second chunk, wherein the first and second secure erase algorithms use different processes to erase the chunks to which they are applied.

13. The system of claim 12, wherein a determination is made for each chunk in the file, including the first and second chunks, based on the security levels for each of the chunks indicated in the chunk security level information, to apply at least one of the first secure erase algorithm and the second secure erase algorithm, and wherein the determined secure erase algorithm for the chunk is applied to erase the chunk.

14. The system of claim 12, wherein the determining of the first secure erase algorithm comprises:
    determining from the chunk security level information a first security level associated with the first chunk; and
    determining from the first security level the first secure erase algorithm associated with the first security level.

15. The system of claim 14, wherein the determining of the second secure erase algorithm comprises:
    determining from the chunk security level information a second security level associated with the second chunk; and
    determining from the second security level the second secure erase algorithm associated with the second security level.

16. The system of claim 15, wherein the operations further comprise:
    maintaining security level algorithm information associating security levels with secure erase algorithms, including associating the first security level with the first secure erase algorithm and associating the second security level with the second secure erase algorithm,
    wherein the determining from the first security level the first secure erase algorithm comprises determining from the security level algorithm information the first secure erase algorithm that is associated with the first security level provided for the first chunk,
    wherein the determining from the second security level the second secure erase algorithm comprises determining from the security level algorithm information the second secure erase algorithm that is associated with the second security level provided for the second chunk.

17. The system of claim 12, wherein the operations further comprise:
    maintaining security level algorithm information associating security levels with secure erase algorithms, including associating the first security level with the first secure erase algorithm and associating the second security level with the second secure erase algorithm;
    determining that the chunk security level information does not provide a security level for the second chunk;
    using a default secure erase algorithm comprising one of the first and the second secure erase algorithms to erase the second chunk in response to determining that the chunk security level information does not provide the security level for the second chunk.

18. The system of claim 17, wherein the default secure erase algorithm provides a maximum secure erase protection of the security algorithms indicated in the secure erase algorithm information.

19. The system of claim 12, wherein the chunk security level information is provided in metadata separate from the file.

20. The system of claim 19, wherein the operations further comprise:
    using the chunk security level information to select storage locations on which to store the chunks, wherein different storage locations are associated with different security levels, and wherein storage locations are selected to store chunks that provide secure storage commensurate with the security levels assigned to the chunks in the chunk security level information.

21. The system of claim 12, wherein the chunk security level information is included in a write request to write the file to storage, wherein chunks comprise contiguous blocks associated with a same security level, and wherein the chunk security level information is used to select storage devices associated with different security levels to store the chunks of the file for the write request.

22. The system of claim 12, wherein the first and second secure erase algorithms are different in at least one of a pattern of data to write and a number of times the pattern of data is written.

* * * * *